United States Patent
Miyanaga

(10) Patent No.: US 11,453,071 B2
(45) Date of Patent: Sep. 27, 2022

(54) CORE CUTTER AND CUTTING METHOD USING THE SAME

(71) Applicant: KABUSHIKI KAISHA MIYANAGA, Miki (JP)

(72) Inventor: Masaaki Miyanaga, Miki (JP)

(73) Assignee: KABUSHIKI KAISHA MIYANAGA, Miki (JP)

( * ) Notice: Subject to any disclaimer, the term of this patent is extended or adjusted under 35 U.S.C. 154(b) by 5 days.

(21) Appl. No.: 17/263,127

(22) PCT Filed: Mar. 26, 2019

(86) PCT No.: PCT/JP2019/012925
§ 371 (c)(1),
(2) Date: Jan. 25, 2021

(87) PCT Pub. No.: WO2020/021771
PCT Pub. Date: Jan. 30, 2020

(65) Prior Publication Data
US 2021/0187630 A1   Jun. 24, 2021

(30) Foreign Application Priority Data

Jul. 26, 2018   (JP) .............................. JP2018-140174

(51) Int. Cl.
*B23B 51/04* (2006.01)
*B23B 35/00* (2006.01)

(52) U.S. Cl.
CPC .............. *B23B 51/04* (2013.01); *B23B 35/00* (2013.01)

(58) Field of Classification Search
CPC ... B23B 51/04; B23B 35/00; B23B 2260/075; B23B 2251/40; Y10T 408/895
See application file for complete search history.

(56) References Cited

U.S. PATENT DOCUMENTS

| 1,994,516 A | 3/1935 | Hawn |
| 5,217,334 A | 6/1993 | Miyazaki et al. |

(Continued)

FOREIGN PATENT DOCUMENTS

| JP | S62111811 U | 7/1987 |
| JP | S6370820 U | 5/1988 |

(Continued)

OTHER PUBLICATIONS

ISA Japan Patent Office, International Search Report Issued in Application No. PCT/JP2019/012925, dated Jun. 18, 2019, WIPO, 3 pages.

*Primary Examiner* — Eric A. Gates
*Assistant Examiner* — Paul M Janeski
(74) *Attorney, Agent, or Firm* — Alleman Hall Creasman & Tuttle LLP

(57) ABSTRACT

A core cutter includes: a cylindrical body; and a tipped bit that is disposed in a manner to protrude from a distal end of the body. The core cutter is configured to cut a workpiece with the bit when the body is rotated about a rotational axis that is an axis of the body. At a distal end of the body, a notch is formed adjacently to the bit at a position forward of the bit in a rotation direction of the body. A width of the notch in a circumferential direction of the body at the distal end of the body is less than or equal to 1.0 mm.

13 Claims, 13 Drawing Sheets

(56) References Cited

U.S. PATENT DOCUMENTS

| | | | | |
|---|---|---|---|---|
| 5,988,956 A * | 11/1999 | Omi | ................ | B23B 51/04 |
| | | | | 408/703 |
| 7,637,703 B2 * | 12/2009 | Khangar | ................ | B23D 61/06 |
| | | | | 408/206 |
| 2010/0278601 A1 * | 11/2010 | Beynon | ................ | B28D 1/041 |
| | | | | 408/1 R |
| 2018/0193926 A1 * | 7/2018 | Sawa | ................ | B23B 51/0466 |

FOREIGN PATENT DOCUMENTS

| | | | |
|---|---|---|---|
| JP | H171011 U | | 5/1989 |
| JP | H4105810 A | | 4/1992 |
| JP | 2000025009 A | | 1/2000 |
| JP | 2000033509 A | * | 2/2000 |
| JP | 2002192412 A | * | 7/2002 |
| JP | 2004181589 A | | 7/2004 |
| JP | 2007083324 A | | 4/2007 |
| JP | 2011506112 A | | 3/2011 |

\* cited by examiner

INNER SIDE ⟵⟶ OUTER SIDE

INNER SIDE ←——→ OUTER SIDE

CORE CUTTER AND CUTTING METHOD USING THE SAME

TECHNICAL FIELD

The present invention relates to a core cutter and a cutting method using the same.

BACKGROUND ART

Conventionally, there is a known core cutter that includes a cylindrical body and a tipped bit. The tipped bit is disposed in a manner to protrude from the distal end of the body. The core cutter is configured to cut a workpiece with the bit when the body is rotated about a rotational axis that is the axis of the body. One of such core cutters is, for example, a hole cutter proposed by Patent Literature 1, which is intended for cutting wooden materials.

The hole cutter for wooden materials, which is disclosed by Patent Literature 1, includes a cylindrical body and a plurality of bits. The plurality of bits are formed on an opening edge at the distal end of the body. The body is provided with notches that are formed corresponding to the plurality of bits, respectively. The notches are intended for discharging swarf that is generated during the cutting.

CITATION LIST

Patent Literature

PTL 1: Japanese Laid-Open Patent Application Publication No. 2000-025009

SUMMARY OF INVENTION

Technical Problem

In the case of Patent Literature 1 and other conventional core cutters, generally speaking, in order to discharge the swarf generated during the cutting, the notches are formed adjacently to the bits at the distal end of the cylindrical body. However, the conventional core cutters have a problem in that when cutting a workpiece having irregularities, the notches bite into the irregularities.

In view of the above, an object of the present invention is to provide a core cutter that is capable of, even in the case of cutting a workpiece having irregularities, preventing the biting into the irregularities, and to provide a cutting method using the core cutter.

Solution to Problem

In order to solve the above-described problems, a core cutter according to the present invention includes: a cylindrical body; and a tipped bit that is disposed in a manner to protrude from a distal end of the body. The core cutter is configured to cut a workpiece with the bit when the body is rotated about a rotational axis that is an axis of the body. At a distal end of the body, a notch is formed adjacently to the bit at a position forward of the bit in a rotation direction of the body. A width of the notch in a circumferential direction of the body at the distal end of the body is less than or equal to 1.0 mm.

According to the above configuration, the width of the notch, which is formed in the body for the purpose of discharging swarf, is less than or equal to 1.0 mm in the circumferential direction at the distal end of the body. Thus, the width of the notch is sufficiently smaller than an expected thickness of a rising portion of irregularities of a workpiece. This consequently makes it possible to provide the core cutter, which is capable of preventing, even in the case of cutting a workpiece having irregularities, the notch from biting into the irregularities.

A rake angle of the bit may be a negative angle.

The above configuration improves the strength of the bit.

The width may be greater than or equal to 0.5 mm, but less than or equal to 0.9 mm.

The above configuration makes it possible to realize, in a balanced manner, both preventing the biting into the irregularities and sufficiently discharging the swarf.

The width may be greater than or equal to 0.6 mm, but less than or equal to 0.8 mm.

The above configuration makes it possible to realize, in a more balanced manner, both preventing the biting into the irregularities and sufficiently discharging the swarf.

The core cutter may include a plurality of the bits. The notch may be formed for each of the bits.

According to the above configuration, the workpiece is cut by the plurality of the bits. This makes it possible to reduce the load on each of the bits, and thereby damage to each of the bits can be further suppressed.

The bits may include a first bit and a second bit. A first distance between a distal end of the first bit and the axis of the body, and a second distance between a distal end of the second bit and the axis of the body, may be different from each other. The first and second bits may be arranged alternately in the circumferential direction of the body.

According to the above configuration, the workpiece can be properly cut by an amount corresponding to the thickness of the bits. Therefore, while cutting the workpiece, the bits and the body can smoothly move forward in the thickness direction of the workpiece.

The bit may include: a protruding portion that protrudes from the distal end of the body; and a fixed portion fixed to the body, the fixed portion being provided such that a position of the fixed portion is shifted from the distal end of the body toward a proximal end of the body. Entirely from a distal end of the notch to a proximal end of the notch, the width of the notch in the circumferential direction of the body may be less than or equal to 1.0 mm, and the proximal end of the notch may be positioned closer to the distal end of the body than a proximal end of the fixed portion of the bit.

The above configuration makes it possible to more assuredly prevent the biting into the irregularities.

The bit may include: a protruding portion that protrudes from the distal end of the body; and a fixed portion fixed to the body, the fixed portion being provided such that a position of the fixed portion is shifted from the distal end of the body toward a proximal end of the body. The notch may include: a distal end portion; and a main portion continuous with a proximal end of the distal end portion. A width of the distal end portion in the circumferential direction of the body may be less than or equal to 1.0 mm. A width of the main portion in the circumferential direction of the body may be greater than 1.0 mm. A proximal end of the main portion may be positioned closer to the proximal end of the body than a proximal end of the fixed portion of the bit.

The above configuration makes it possible to realize, in a balanced manner, both preventing the biting into the irregularities and sufficiently discharging the swarf.

In order to solve the above-described problems, a cutting method according to one aspect of the present invention is a cutting method using any of the above-described core cutters. The cutting method includes: a first step of preparing the core cutter, an electric drill to which the core cutter is to be mounted as a distal end tool, and a workpiece having irregularities on a surface thereof; a second step of mounting the core cutter to the electric drill after the first step; and a third step of pressing a distal end side of the core cutter against a rising portion of the irregularities along a rising direction of the rising portion while rotating the core cutter by the electric drill about a rotational axis that is an axis of the core cutter to cut a part of the irregularities after the first and second steps.

According to the above configuration, by using any of the above-described core cutters, the cutting method according to the one aspect of the present invention is able to, even in the case of cutting a workpiece having irregularities, prevent the notch from biting into the irregularities.

The workpiece prepared in the first step may include at least two projections on the surface thereof. The first step may further include preparing a jig, the jig including: a base portion that is placeable on the workpiece such that a bottom surface of the base portion is in contact with upper ends of the respective at least two projections; a cylindrical portion provided upright at a center of an upper end of the base portion; and a through-hole drilled in the jig from the bottom surface of the base portion to an upper end of the cylindrical portion, the through-hole corresponding to an external diameter of the body of the core cutter. The third step may include: placing the jig on the workpiece such that the through-hole of the jig on the bottom surface side of the base portion is positioned between the at least two projections, and such that the bottom surface of the base portion is in contact with the upper ends of the respective at least two projections; and then inserting the core cutter into the through-hole of the jig placed on the workpiece from an upper end side of the jig while rotating the core cutter by the electric drill about the rotational axis, which is the axis of the core cutter, to cut a part of the at least two projections.

According to the above configuration, movement of the core cutter in the radial direction is restricted by the jig, and thereby oscillation of the core cutter can be prevented when cutting the irregularities of the workpiece. Consequently, even in a case where the workpiece has irregularities, the workpiece can be cut as desired.

The third step may include fixing parts of the base portion of the jig, the parts being placed on the upper ends of the respective at least two projections of the workpiece, to the upper ends of the respective at least two projections, and then inserting the core cutter into the through-hole of the jig from the upper end side of the jig.

According to the above configuration, even in a case where the workpiece has irregularities, the workpiece can be cut as desired more assuredly.

For example, the third step may include fixing the parts of the base portion of the jig, the parts being placed on the upper ends of the respective at least two projections of the workpiece, to the upper ends of the respective at least two projections by stepping on the parts by feet, and then inserting the core cutter into the through-hole of the jig from the upper end side of the jig.

For example, the third step may include fixing the parts of the base portion of the jig, the parts being placed on the upper ends of the respective at least two projections of the workpiece, to the upper ends of the respective at least two projections by using fixing members, and then inserting the core cutter into the through-hole of the jig from the upper end side of the jig.

In order to solve the above-described problems, a cutting method according to another aspect of the present invention includes: a first step of preparing a core cutter including a cylindrical body and a tipped bit that is disposed in a manner to protrude from a distal end of the body, the core cutter being configured to cut a workpiece with the bit when the body is rotated about a rotational axis that is an axis of the body, an electric drill to which the core cutter is to be mounted as a distal end tool, a workpiece having at least two projections on a surface thereof, and a jig including a base portion, a cylindrical portion, and a through-hole, the base portion being placeable on the workpiece such that a bottom surface of the base portion is in contact with upper ends of the respective at least two projections, the cylindrical portion being provided upright at a center of an upper end of the base portion, the through-hole being drilled in the jig from the bottom surface of the base portion to an upper end of the cylindrical portion, the through-hole corresponding to an external diameter of the body of the core cutter; a second step of mounting the core cutter to the electric drill after the first step; and a third step of, after the first and second steps, placing the jig on the workpiece such that the through-hole of the jig on the bottom surface side of the base portion is positioned between the at least two projections of the workpiece, and such that the bottom surface of the base portion is in contact with the upper ends of the respective at least two projections, fixing parts of the base portion of the jig, the parts being placed on the upper ends of the respective at least two projections, to the upper ends of the respective at least two projections by stepping on the parts by feet, and then inserting the core cutter into the through-hole of the jig placed on the workpiece from an upper end side of the jig while rotating the core cutter by the electric drill about a rotational axis that is an axis of the core cutter, and pressing a distal end side of the core cutter against a rising portion of the at least two projections along a rising direction of the rising portion to cut a part of the at least two projections.

According to the above configuration, movement of the core cutter in the radial direction is restricted by the jig, and thereby the cutting method according to the other aspect of the present invention can prevent oscillation of the core cutter when cutting the irregularities of the workpiece. In addition, the jig is fixed to the workpiece by stepping on the jig with feet. Therefore, the jig will not move when cutting the irregularities of the workpiece. Consequently, even in a case where the workpiece has irregularities, the workpiece can be cut as desired.

Advantageous Effects of Invention

The present invention makes it possible to provide a core cutter that is capable of, even in the case of cutting a workpiece having irregularities, preventing biting into the irregularities, and to provide a cutting method using the core cutter.

BRIEF DESCRIPTION OF DRAWINGS

FIG. 1A is a front view; and FIG. 1B is a bottom view.

FIG. 2A is a front view of the first bit, and FIG. 2B is a sectional view taken by cutting a body along a height direction, the sectional view showing the first bit seen in the circumferential direction of the body.

FIG. 3A is a front view of the second bit; and FIG. 3B is a sectional view taken by cutting the body along the height direction, the sectional view showing the second bit seen in the circumferential direction of the body.

FIG. 6A is a perspective view; and FIG. 6B is a sectional view taken by cutting a projection of the workpiece along the height direction, the sectional view showing the first bit seen in the length direction of the projection.

FIG. 7A is a front view; and FIG. 7B is a bottom view.

FIG. 9A is a front view; and FIG. 9B is a bottom view.

DESCRIPTION OF EMBODIMENTS

Figure 1A:
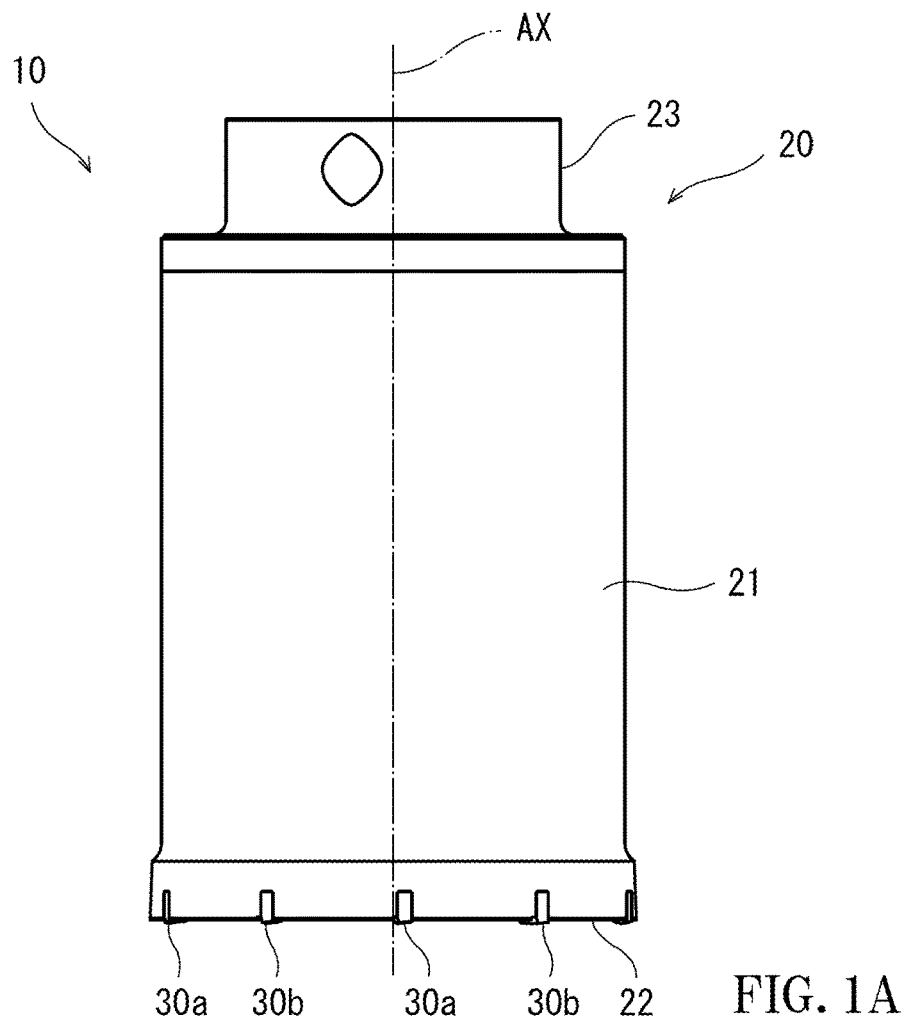
FIGS. 1A and 1B show a core cutter according to one embodiment of the present invention.

Hereinafter, a core cutter according to one embodiment of the present invention is described with reference to the drawings. It should be noted that the present invention is not limited to the present embodiment. In the drawings, the same or corresponding elements are denoted by the same reference signs, and repeating the same descriptions is avoided below.

(Core Cutter 10)

Figure 1B:
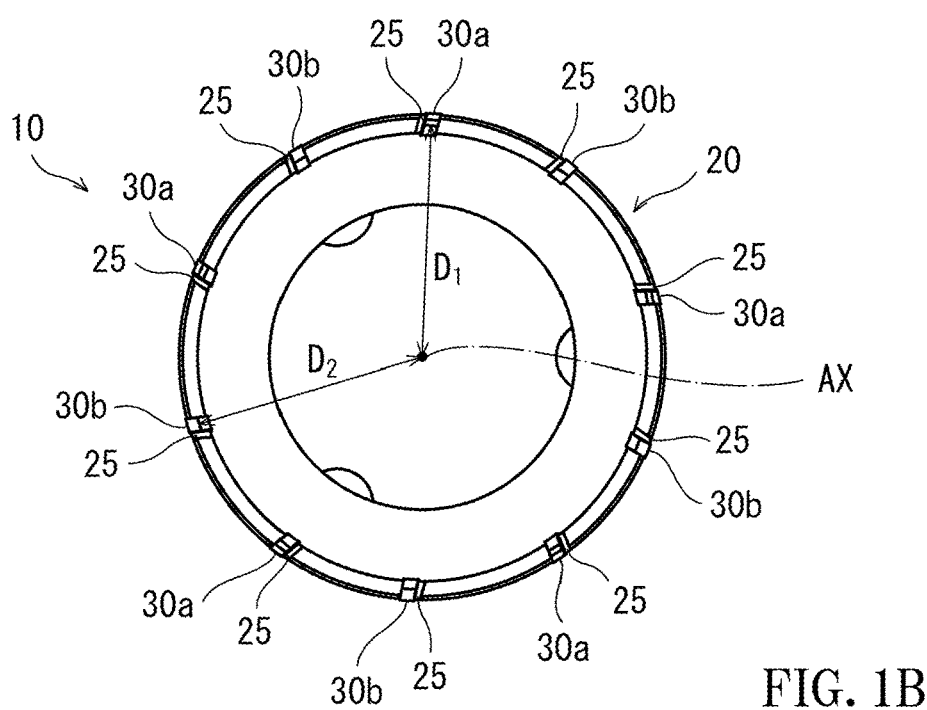

FIGS. 1A and 1B show the core cutter according to the one embodiment of the present invention. FIG. 1A is a front view, and FIG. 1B is a bottom view. As shown in FIGS. 1A and 1B, the core cutter 10 according to the present embodiment includes a cylindrical body 20 and tipped bits 30. The tipped bits 30 are disposed in a manner to protrude from the distal end of the body 20. The core cutter 10 is configured to cut a workpiece with the bits 30 when the body 20 is rotated about a rotational axis that is an axis AX of the body 20.

It should be noted that, in the description below, a direction connecting between the distal end (the lower end in FIGS. 1A and 1B) and the proximal end (the upper end in FIGS. 1A and 1B) of the core cutter 10 may be referred to as a height direction. Also, the distal-end side of the core cutter 10 may be referred to as a lower side or downward, and the proximal-end side of the core cutter 10 may be referred to as an upper side or upward.

(Body 20)

The cylindrical body 20 has a proximal end surface and a distal end surface that are both open. That is, the body 20 is formed as a hollow body. The body 20 includes a body main part 21 and a proximal end portion 23. The proximal end portion 23 is continuous with the proximal end surface of the body main part 21, and the diameter of the proximal end portion 23 is less than that of the body main part 21. The thickness of the distal end portion of the body main part 21 (i.e., the dimension of the distal end portion in the radial direction of the body 20) is greater than the thickness of the remaining portion of the body main part 21. The bits 30 are fixed to the distal end portion of the body main part 21. It should be noted that the diameter of the body main part 21 may be about 65 mm.

(Bits 30)

The core cutter 10 includes a plurality of bits 30. Specifically, the bits 30 include five first bits 30a and five second bits 30b. The first and second bits 30a and 30b are arranged alternately in the circumferential direction of the body 20.

Figure 2A:
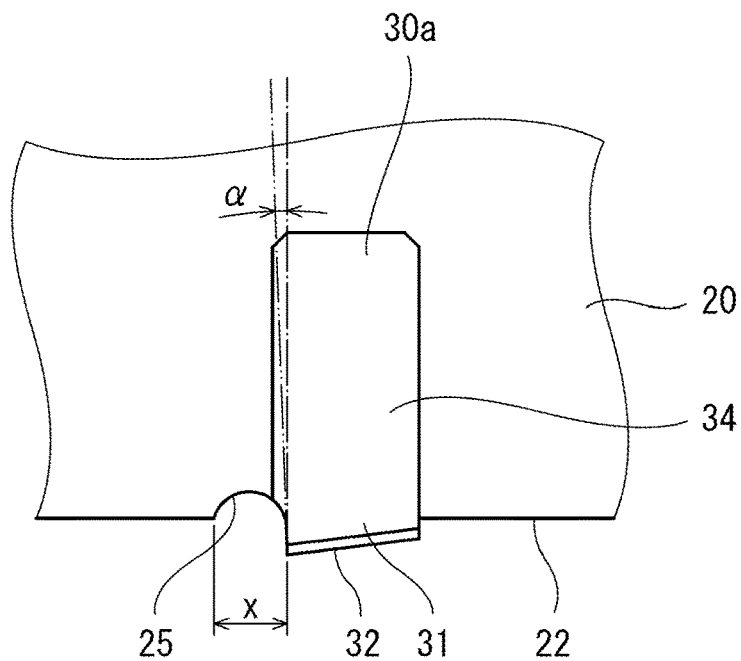
FIGS. 2A and 2B are enlarged views showing a first bit of the core cutter according to the one embodiment of the present invention.
Figure 2B:
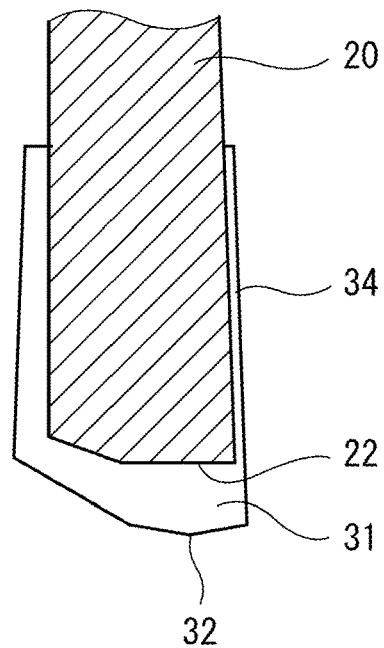

FIGS. 2A and 2B are enlarged views showing a first bit of the present embodiment. FIG. 2A is a front view of the first bit, and FIG. 2B is a sectional view taken by cutting the body along the height direction, the sectional view showing the first bit seen in the circumferential direction of the body. As shown in FIG. 2A, the first bit 30a includes a protruding portion 31 and a fixed portion 34. The protruding portion 31 protrudes from the distal end 22 of the body 20. The fixed portion 34 is provided such that the position of the fixed portion 34 is shifted from the distal end 22 of the body 20 toward the proximal end of the body 20, and the fixed portion 34 is fixed to the body 20. When the first bit 30a is seen in the front view, the distal end 32 of the first bit 30a (i.e., the distal end of the protruding portion 31) is linearly sloped such that the height position of the distal end 32 becomes lower toward the forward side in the rotation direction of the body 20.

As shown in FIG. 2B, in the sectional view, which is taken by cutting the body 20 along the height direction and which shows the first bit 30a seen in the circumferential direction of the body 20, the first bit 30a includes a first lower end edge that is linearly sloped from the distal end 32, such that the height position of the first lower end edge becomes higher toward the outer side of the body 20. The first lower end edge extends in the circumferential direction of the body 20 (i.e., from the front side toward the back side of FIG. 2B).

Also, in the sectional view, which is taken by cutting the body 20 along the height direction and which shows the first bit 30a seen in the circumferential direction of the body 20, the first bit 30a further includes a second lower end edge and a third lower end edge. The second lower end edge is linearly sloped from the distal end 32, such that the height position of the second lower end edge becomes higher toward the inner side of the body 20. The third lower end edge starts from the inner end of the second lower end edge, and bends toward the proximal end. The third lower end edge is linearly sloped such that the height position of the third lower end edge becomes higher toward the inner side of the body 20. Each of the second lower end edge and the third lower end edge extends in the circumferential direction of the body 20 (i.e., from the front side toward the back side of FIG. 2B).

Figure 3A:
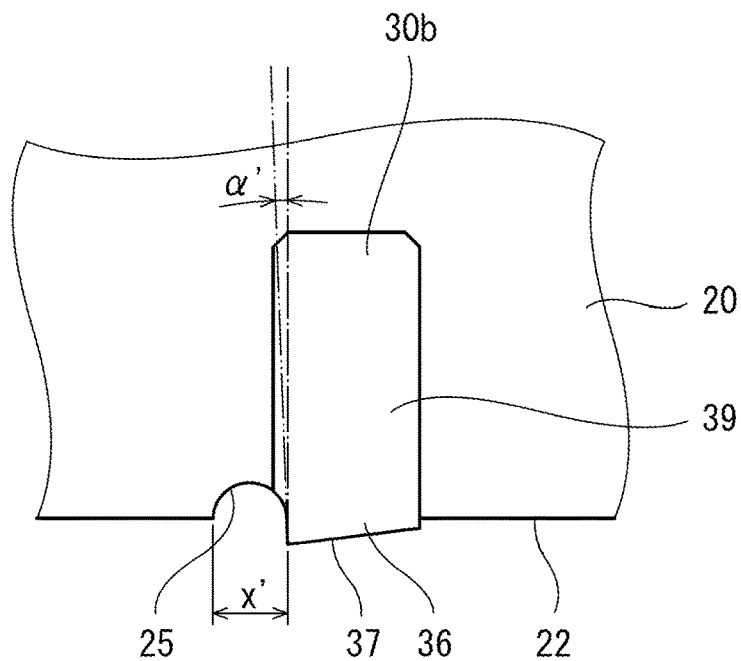
FIGS. 3A and 3B are enlarged views showing a second bit of the core cutter according to the one embodiment of the present invention.
Figure 3B:
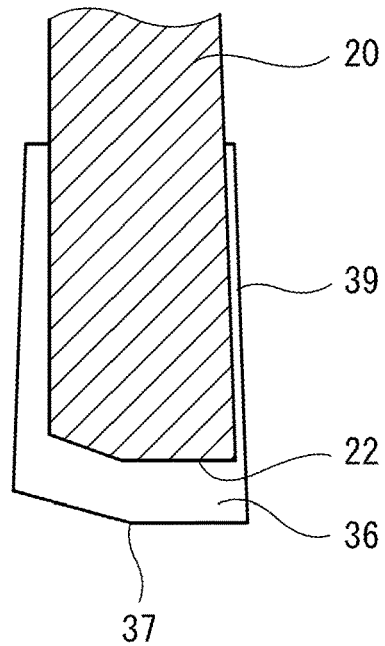

FIGS. 3A and 3B are enlarged views showing a second bit of the present embodiment. FIG. 3A is a front view of the second bit, and FIG. 3B is a sectional view taken by cutting the body along the height direction, the sectional view showing the second bit seen in the circumferential direction of the body. As shown in FIG. 3A, the second bit 30b includes a protruding portion 36 and a fixed portion 39. The protruding portion 36 protrudes from the distal end 22 of the body 20. The fixed portion 39 is provided such that the position of the fixed portion 39 is shifted from the distal end 22 of the body 20 toward the proximal end of the body 20, and the fixed portion 39 is fixed to the body 20. When the second bit 30b is seen in the front view, the distal end 37 of the second bit 30b (i.e., the distal end of the protruding portion 36) is linearly sloped such that the height position of the distal end 37 becomes lower toward the forward side in the rotation direction of the body 20.

As shown in FIG. 3B, in the sectional view, which is taken by cutting the body 20 along the height direction and which shows the second bit 30b seen in the circumferential direction of the body 20, the second bit 30b includes a fourth lower end edge that linearly extends from the distal end 37 toward the outer side of the body 20 at the same height position. The fourth lower end edge extends in the circumferential direction of the body 20 (i.e., from the front side toward the back side of FIG. 3B).

Also, in the sectional view, which is taken by cutting the body 20 along the height direction and which shows the second bit 30b seen in the circumferential direction of the body 20, the second bit 30b further includes a fifth lower end edge. The fifth lower end edge is linearly sloped from the distal end 37, such that the height position of the fifth lower end edge becomes higher toward the inner side of the body 20. The fifth lower end edge extends in the circumferential direction of the body 20 (i.e., from the front side toward the back side of FIG. 3B).

As shown in FIG. 1B, a first distance $D_1$ between the distal end 32 of the first bit 30a and the axis AX of the body 20, and a second distance $D_2$ between the distal end 37 of the second bit 30b and the axis AX of the body 20, are different from each other. Specifically, it is clear from the comparison of FIG. 2B and FIG. 3B that the first distance $D_1$ is greater than the second distance $D_2$.

Here, as shown in FIG. 2A, when the first bit 30a is seen in the front view, from the front end of the distal end 32 of the first bit 30a in the rotation direction, a surface extends diagonally upward and connects to the rear end of a notch 25 in the rotation direction. This surface is generally called a "rake face". A two-dot chain line in FIG. 2A is an upward extension of the rake face. A one-dot chain line in FIG. 2A represents a vertical plane that extends in the height direction passing through the front end of the distal end 32 of the first bit 30a in the rotation direction. The rake face forms an angle $\alpha$ with the vertical plane. In general, the angle $\alpha$ is referred to as a "rake angle".

Further, in FIG. 2A, when the rake face of the first bit 30a is positioned on the right side of the vertical plane, the rake angle $\alpha$ of the first bit 30a is a positive angle. On the other hand, when the rake face of the first bit 30a is positioned on the left side of the vertical plane, the rake angle $\alpha$ of the first bit 30a is a negative angle. It should be noted that the above definitions of the "rake face" and the "rake angle" also apply to FIG. 3A and FIG. 8, which will be referred to below.

As shown in FIG. 2A, in the present embodiment, the rake angle $\alpha$ of the first bit 30a is a negative angle. Similarly, as shown in FIG. 3A, the rake angle $\alpha'$ of the second bit 30b is a negative angle. These rake angles $\alpha$ and $\alpha'$ are equal negative angles. It should be noted that the rake angles $\alpha$ and $\alpha'$ may be determined by mounting angles at which the first bit 30a and the second bit 30b are mounted to the body 20, respectively. Alternatively, the rake angles $\alpha$ and $\alpha'$ may be determined by grinding the distal end of the first bit 30a and the distal end of the second bit 30b by grinding stone.

It should be noted that in a case where the diameter of the body main part 21 is about 65 mm, the thickness of the fixed portion 34 of each of the first bit 30a and the second bit 30b (i.e., the dimension of the fixed portion 34 in the radial direction of the body 20) may be about 3.2 mm. Also, the distance between the distal end 32 of the protruding portion 31 and the distal end 22 of the body 20 (and the distance between the distal end 37 of the protruding portion 36 and the distal end 22 of the body 20) may be about 0.50 mm.

(Notches 25)

As shown in FIG. 2A, at the distal end of the body 20, the aforementioned notch 25 is formed adjacently to the first bit 30a at a position forward of the first bit 30a in the rotation direction of the body 20. The notch 25 is intended for discharging swarf that is generated during cutting by the first bit 30a. It should be noted that the same notches 25 are formed for the five first bits 30a, respectively. Similarly, as shown in FIG. 3A, at the distal end of the body 20, the same notch 25 is formed adjacently to the second bit 30b at a position forward of the second bit 30b in the rotation direction of the body 20. It should be noted that the same notches 25 are formed for the five second bits 30b, respectively.

When each of the first bit 30a and the second bit 30b is seen the front view, each notch 25 has a semicircular shape such that the notch 25 protrudes from the distal end of the body 20 toward the proximal end of the body 20. At the distal end of the body 20, a width X of each notch 25 in the circumferential direction is less than or equal to 1.0 mm. It should be noted that the width X may be greater than or equal to 0.5 mm, but less than or equal to 0.9 mm. Alternatively, the width X may be greater than or equal to 0.6 mm, but less than or equal to 0.8 mm. In the present embodiment, entirely from the distal end to the proximal end of each notch 25, the width of the notch 25 in the circumferential direction of the body 20 is less than or equal to 1.0 mm. Also, the proximal ends of the notches 25 are positioned closer to the distal end of the body 20 than the proximal ends of the fixed portions 34 and 39 of the bits 30 (i.e., the first and second bits 30a and 30b).

Advantageous Effects

In the core cutter 10 according to the present embodiment, the width of each notch 25, which is formed in the body 20 for the purpose of discharging the swarf, is less than or equal to 1.0 mm in the circumferential direction at the distal end of the body 20. Thus, the width of each notch is sufficiently smaller than an expected thickness of a rising portion of irregularities of a workpiece (this will be described below in detail with reference to FIGS. 5 to 6B). Consequently, even in the case of cutting a workpiece having irregularities, the notches can be prevented from biting into the irregularities.

In the core cutter 10 according to the present embodiment, since the rake angles $\alpha$ and $\alpha'$ of the bits 30 (i.e., the first and second bits 30a and 30b) are negative angles, the strength of the bits 30 is improved, which consequently makes it possible to suppress damage to the bits 30.

In the core cutter 10 according to the present embodiment, the width of each notch 25 in the circumferential direction at the distal end of the body 20 may be set to be greater than or equal to 0.5 mm, but less than or equal to 0.9 mm. This setting makes it possible to realize, in a balanced manner, both preventing the biting into the irregularities and sufficiently discharging the swarf.

In the core cutter 10 according to the present embodiment, the width of each notch 25 in the circumferential direction at the distal end of the body 20 may be set to be greater than or equal to 0.6 mm, but less than or equal to 0.8 mm. This setting makes it possible to realize, in a more balanced manner, both preventing the biting into the irregularities and sufficiently discharging the swarf.

The core cutter 10 according to the present embodiment includes the plurality of bits 30, and the notches 25 are formed for the respective bits 30. According to this configuration, the workpiece is cut by the plurality of bits 30. This makes it possible to reduce the load on each of the bits 30, and thereby damage to each of the bits 30 can be further suppressed.

In the present embodiment, the first distance $D_1$ between the distal end 32 of the first bit 30a and the axis AX of the body 20, and the second distance $D_2$ between the distal end 37 of the second bit 30b and the axis AX of the body 20, are different from each other, and the first and second bits 30a and 30b are arranged alternately in the circumferential direction of the body 20. According to this configuration, the workpiece can be properly cut by an amount corresponding to the thickness of the bits 30. Therefore, while cutting the workpiece, the bits 30 and the body 20 can smoothly move forward in the thickness direction of the workpiece.

In the present embodiment, entirely from the distal end to the proximal end of each notch 25 formed in the body 20, the width of the notch 25 in the circumferential direction of the body 20 is less than or equal to 1.0 mm, and also, the proximal ends of the notches 25 are positioned closer to the distal end of the body 20 than the proximal ends of the fixed portions 34 and 39 of the bits 30. This makes it possible to more assuredly prevent the biting into the irregularities of the workpiece.

In the present embodiment, the thickness of the distal end portion of the body main part 21 is greater than the thickness of the remaining portion of the body main part 21, and the bits 30 are fixed to the distal end portion. This makes it possible to increase the thickness of the bits 30, thereby improving the durability thereof. Moreover, since the area of contact between the body main part 21 and the fixed portions 34 of the bits 30 can be increased, the bits 30 can be firmly fixed to the body 20.

(One Example of Cutting Method)

Next, with reference to FIGS. 4 to 7B, one example of a cutting method using the core cutter 10 according to the above-described embodiment is described. It should be noted that the cutting method described herein is not limited to a case where the cutting method is performed by using the core cutter 10 according to the above-described embodiment. For example, the cutting method may be performed by using a core cutter 10' described below (see FIG. 7A to FIG. 8), a core cutter 10" described below (see FIG. 9A to FIG. 10), or any other core cutter.

First, a first step is performed, which is a step of preparing the core cutter 10 according to the above-described embodiment, an electric drill 100 to which the core cutter 10 is to be mounted as a distal end tool, and a workpiece W having irregularities on the surface thereof.

Figure 4:
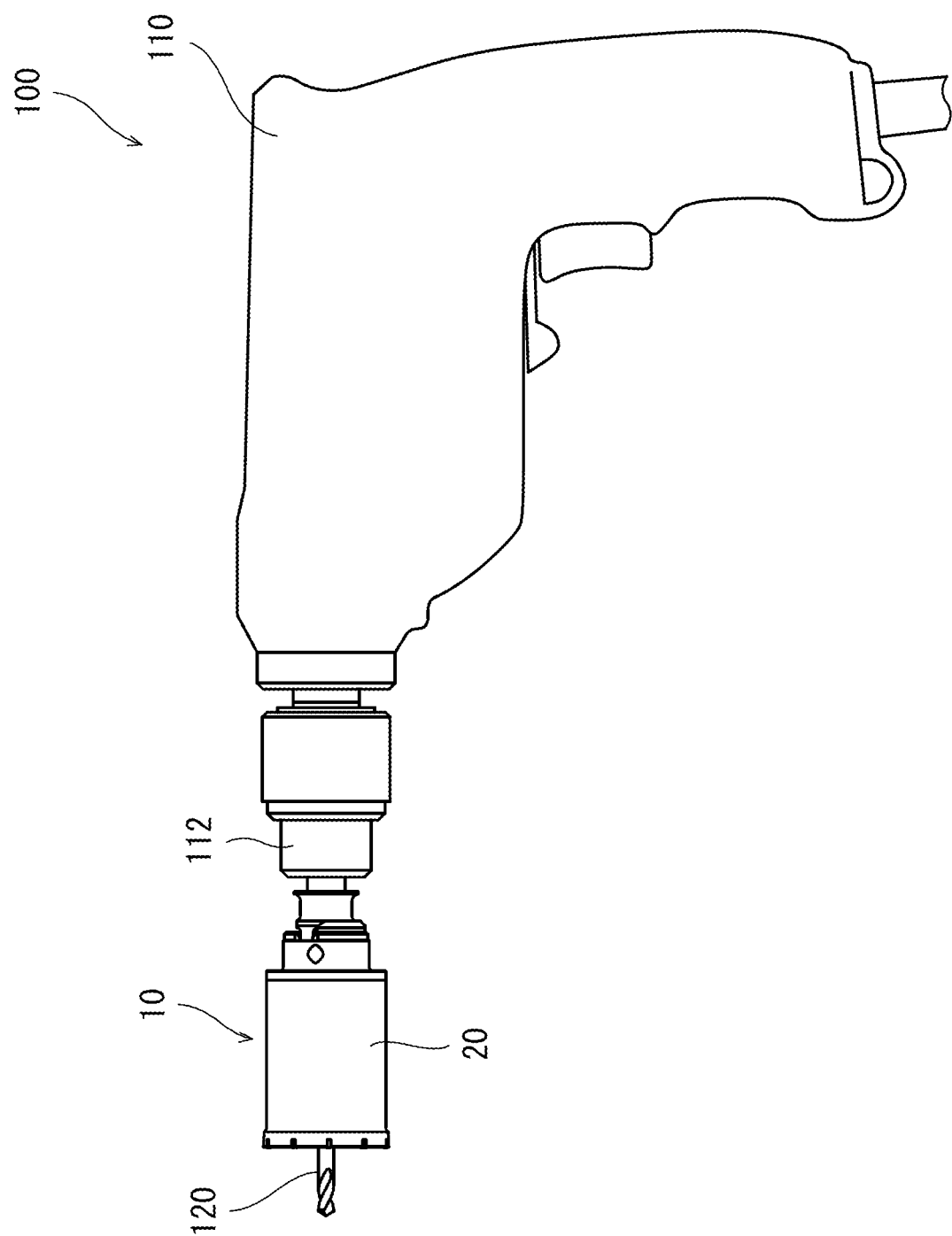
FIG. 4 is a diagram for describing first and second steps of a cutting method according to the one embodiment of the present invention.
Figure 5:
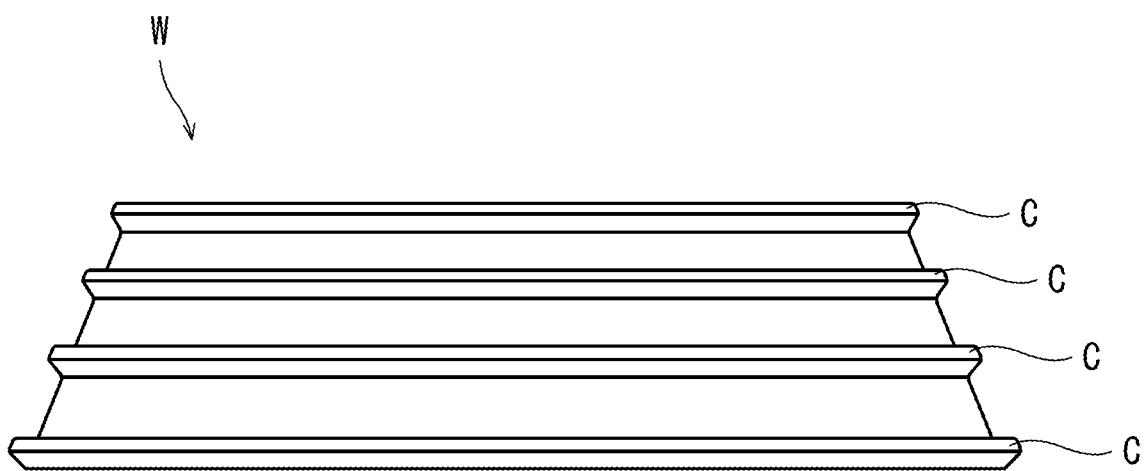
FIG. 5 is a perspective view of a workpiece prepared in the first step of the cutting method according to the one embodiment of the present invention.

Next, a second step is performed, which is a step of mounting the core cutter 10 prepared in the first step to the electric drill 100. FIG. 4 shows a state where the core cutter 10 is mounted to the electric drill 100 in the second step. FIG. 5 shows the workpiece W, which has irregularities and which is prepared in the first step.

As shown in FIG. 4, the electric drill 100 includes an electric drill body 110 and a mounting chuck 112. First, a center drill 120 and a shank (not shown) are mounted to the core cutter 10. The center drill 120 is disposed in a manner to extend on the axis AX in the interior space of the body 20 and protrude from the opening at the distal end 22 of the body 20. The unshown shank is disposed in a manner to extend from the proximal end portion 23 of the body 20 toward the opposite side to the center drill 120. Then, the shank is held by the mounting chuck 112 of the electric drill 100. In this manner, the core cutter 10 is mounted to the electric drill 100 as shown in FIG. 4.

Figure 6A:
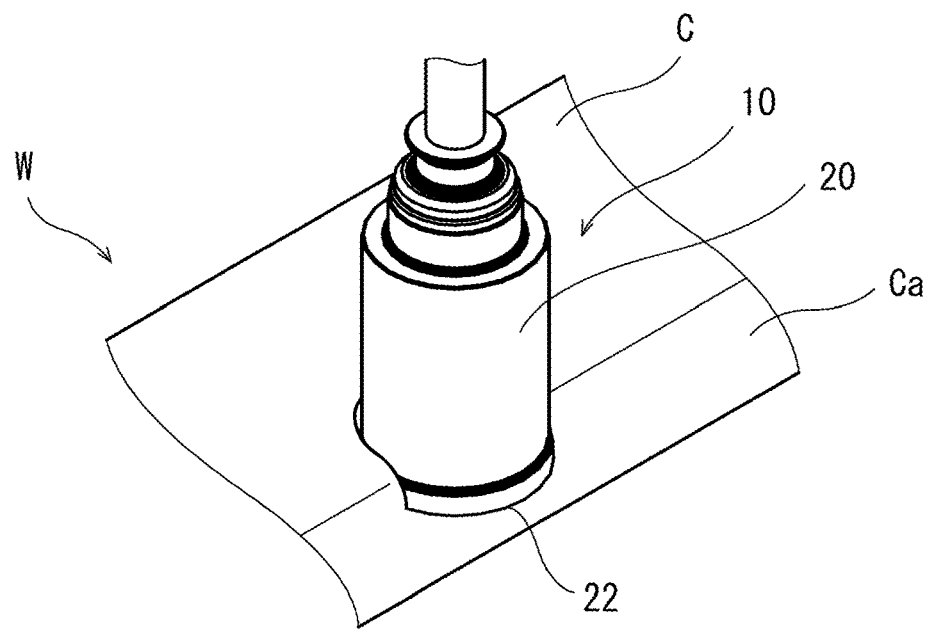
FIGS. 6A and 6B show a state where a third step of the cutting method according to the one embodiment of the present invention is being performed.
Figure 6B:
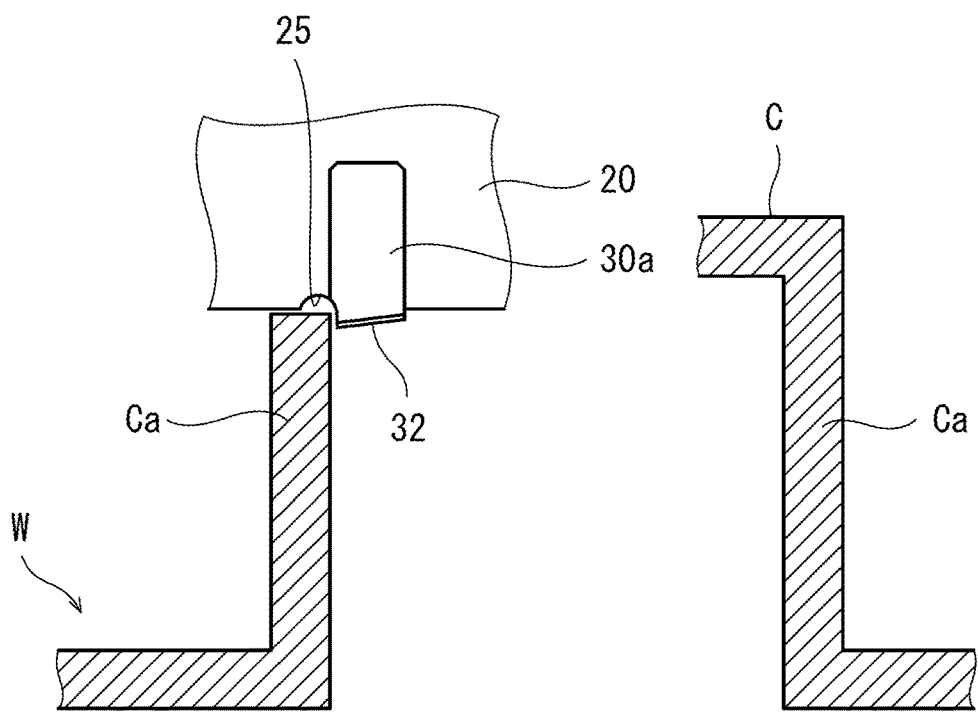

As shown in FIG. 5, the workpiece W is a plate-shaped deck plate having four projections C on the surface thereof. It should be noted that the workpiece W is a metal workpiece. The four projections C are parallel to each other and extend in the length direction of the workpiece W. As shown in FIG. 6B, which will be referred to below, each of the four projections C is formed by bending a part of the plate-shaped deck plate. Accordingly, the thickness of each of the four projections C is the same as the thickness of the remaining part of the plate-shaped deck plate. The bottom face of each projection C is open, and thus each projection C is formed as a hollow projection.

By the electric drill 100, the core cutter 10 is rotated about the rotational axis, which is the axis AX of the core cutter 10. The distal end side of the rotating core cutter 10 is pressed against a rising portion Ca of the irregularities (specifically, the rising portion Ca of a projection C) along the rising direction of the rising portion Ca, and thereby a third step of cutting a part of the irregularities (specifically, a part of the projection C) is performed, which is shown in FIGS. 6A and 6B. FIG. 6A is a perspective view showing the third step being performed. FIG. 6B is a sectional view taken by cutting the projection C of the workpiece W along the height direction, the sectional view showing the first bit 30a seen in the length direction of the projection C.

By cutting the workpiece W as in the above third step, as shown in FIG. 6A, while the cutting is being performed, a part of the opening of the distal end 22 of the body 20 is not blocked by the workpiece W, and is thus exposed. Accordingly, swarf generated during the cutting is discharged through the part of the opening. Therefore, as previously described in the above embodiment, the notches 25 for discharging the swarf can be made smaller than those in the conventional art. Moreover, unlike the conventional art, it is unnecessary to form gullet grooves in the distal end portion of the body main part 21 adjacently to the bits 30 for the purpose of discharging the swarf generated during the cutting toward the proximal end of the body 20. For this reason, the area of contact between the body main part 21 and the fixed portions 34 of the bits 30 can be increased, and thereby the bits 30 can be firmly fixed to the body 20.

Further, as shown in FIG. 6B, the width of the notch 25 in the circumferential direction at the distal end of the body 20 is less than or equal to 1.0 mm, which is sufficiently smaller than an expected thickness of a rising portion of the irregularities (specifically, the rising portion of a projection C) of the workpiece. Consequently, even in the case of cutting the workpiece W having irregularities, the notches 25 can be prevented from biting into the irregularities.

(First Variation)

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

Figure 7A:
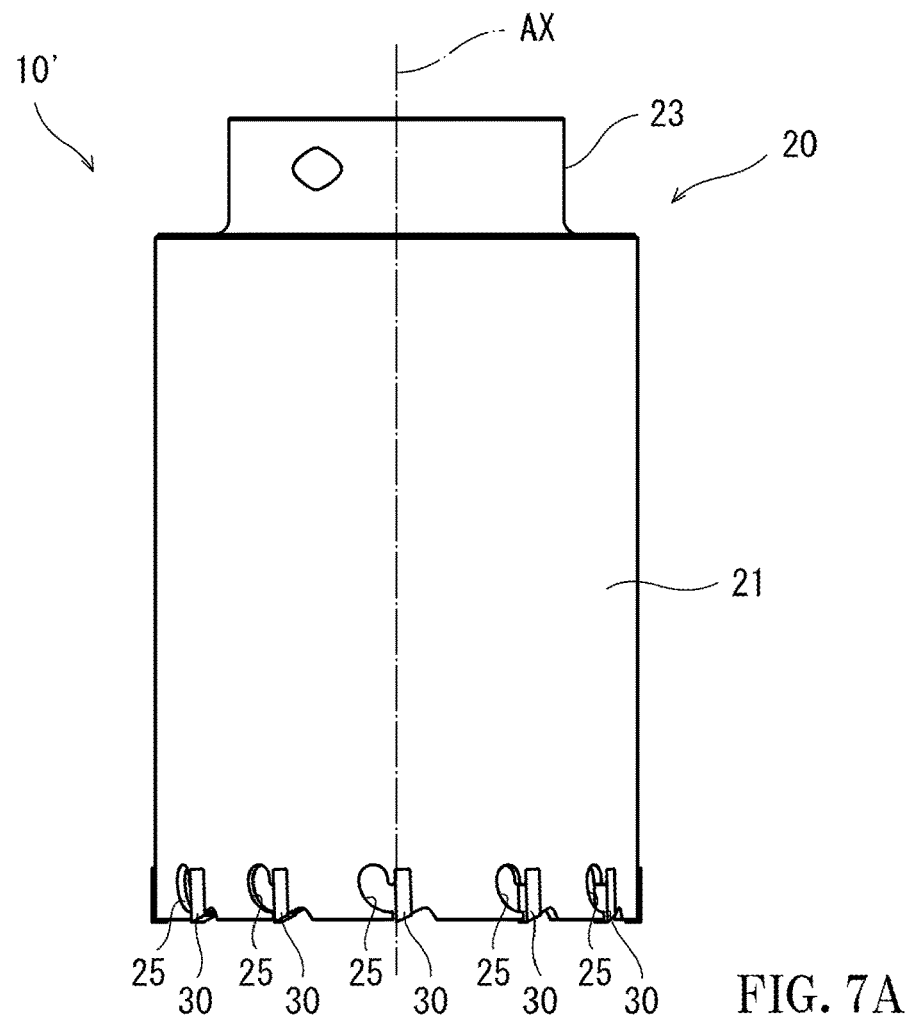
FIGS. 7A and 7B show a first variation of the core cutter according to the one embodiment of the present invention.
Figure 7B:
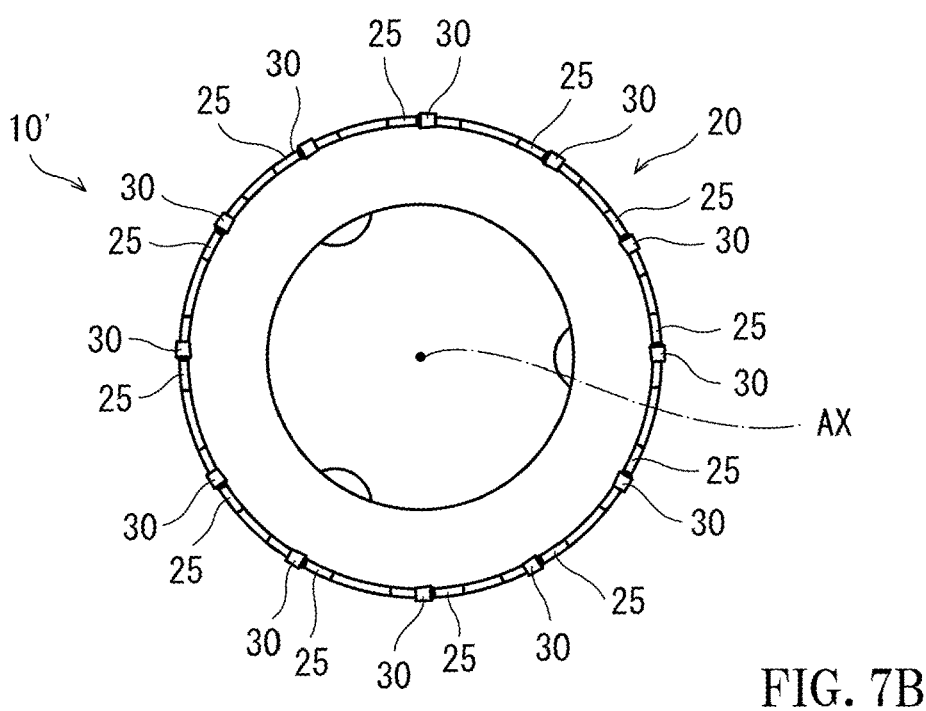
Figure 8:
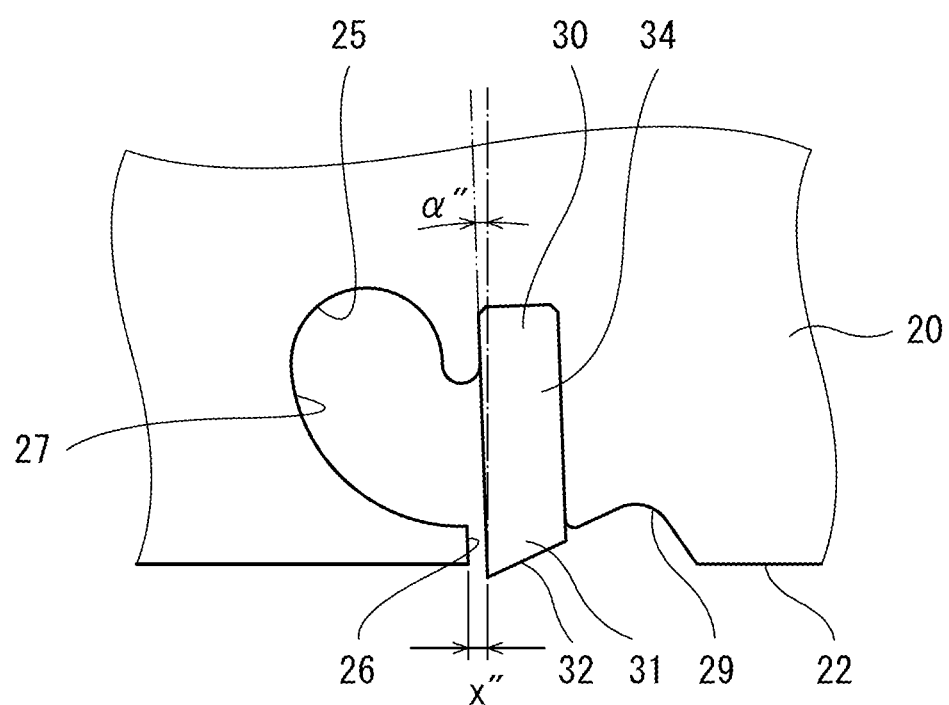
FIG. 8 is an enlarged front view showing the bit of the first variation of the core cutter according to the one embodiment of the present invention.

With reference to FIGS. 7A to 8, a first variation of the core cutter according to the one embodiment of the present invention is described. FIGS. 7A and 7B show the first variation of the core cutter. FIG. 7A is a front view, and FIG. 7B is a bottom view. FIG. 8 is an enlarged front view showing the bit of the first variation of the core cutter.

It should be noted that the core cutter 10' of the first variation is the same in structure as the above-described core cutter 10 except the bits 30, the notches 25 formed in the body 20, and the following thickness feature of the body main part 21: the thickness of the body main part 21 is the same entirely from the distal end to the proximal end of the body main part 21, including its distal end portion. Therefore, common components between the above-described core cutter 10 and the core cutter 10' of the first variation are denoted by the same reference signs, and repeating the same descriptions is avoided herein.

As shown in FIGS. 7A and 7B, the core cutter 10' of the present variation includes ten tipped bits 30, which are disposed in a manner to protrude from the distal end of the body 20. It should be noted that, unlike the above-described embodiment, all the bits 30 of the present variation have the same shape.

It should be noted that, in a case where the diameter of the body main part 21 is about 65 mm, the thickness of the fixed portion 34 of each of the bits 30 (i.e., the dimension of the fixed portion 34 in the radial direction of the body 20) may be about 2.0 mm. Also, the distance between the distal end 32 of the protruding portion 31 and the distal end 22 of the body 20 may be about 0.35 mm.

As shown in FIG. 8, in the core cutter 10' of the present variation, an auxiliary notch 29 is formed adjacently to each bit 30 at a position rearward of the bit 30 in the rotation direction of the body 20.

As shown in FIG. 8, in the core cutter 10' of the present variation, the notch 25 is formed adjacently to each bit 30 at a position forward of the bit 30 in the rotation direction of the body 20, and the rake angle α" of the bit 30 is a negative angle. Also, the width of the notch 25 in the circumferential direction at the distal end of the body 20 is less than or equal to 1.0 mm. It should be noted that the width may be greater than or equal to 0.5 mm, but less than or equal to 0.9 mm. Alternatively, the width may be greater than or equal to 0.6 mm, but less than or equal to 0.8 mm.

The notch 25 of the present variation includes a distal end portion 26 and a main portion 27. When the bit 30 is seen in the front view, the distal end portion 26 extends rectangularly in the height direction, and the main portion 27 is continuous with the proximal end of the distal end portion 26. The main portion 27 of the notch 25 has an end edge. From the proximal end of the rotational-direction forward end edge of the distal end portion 26 of the notch 25, the end edge of the main portion 27 protrudes forward in the rotation direction and is curved in a substantially arc shape, and then, at a position that is adjacent to and forward of the proximal end portion of the bit 30 in the rotation direction, the end edge is curved again in a substantially arc shape so as to protrude downward.

The width of the distal end portion 26 of the notch 25 in the circumferential direction of the body 20 is less than or equal to 1.0 mm; the width of the main portion 27 of the notch 25 in the circumferential direction of the body 20 is greater than 1.0 mm; and the proximal end of the main portion 27 is positioned closer to the proximal end of the body 20 than the proximal end of the fixed portion 34 of the bit 30. This configuration makes it possible to realize, in a balanced manner, both preventing the notches from biting into the irregularities of the workpiece W and sufficiently discharging the swarf (Second Variation)

Figure 9A:
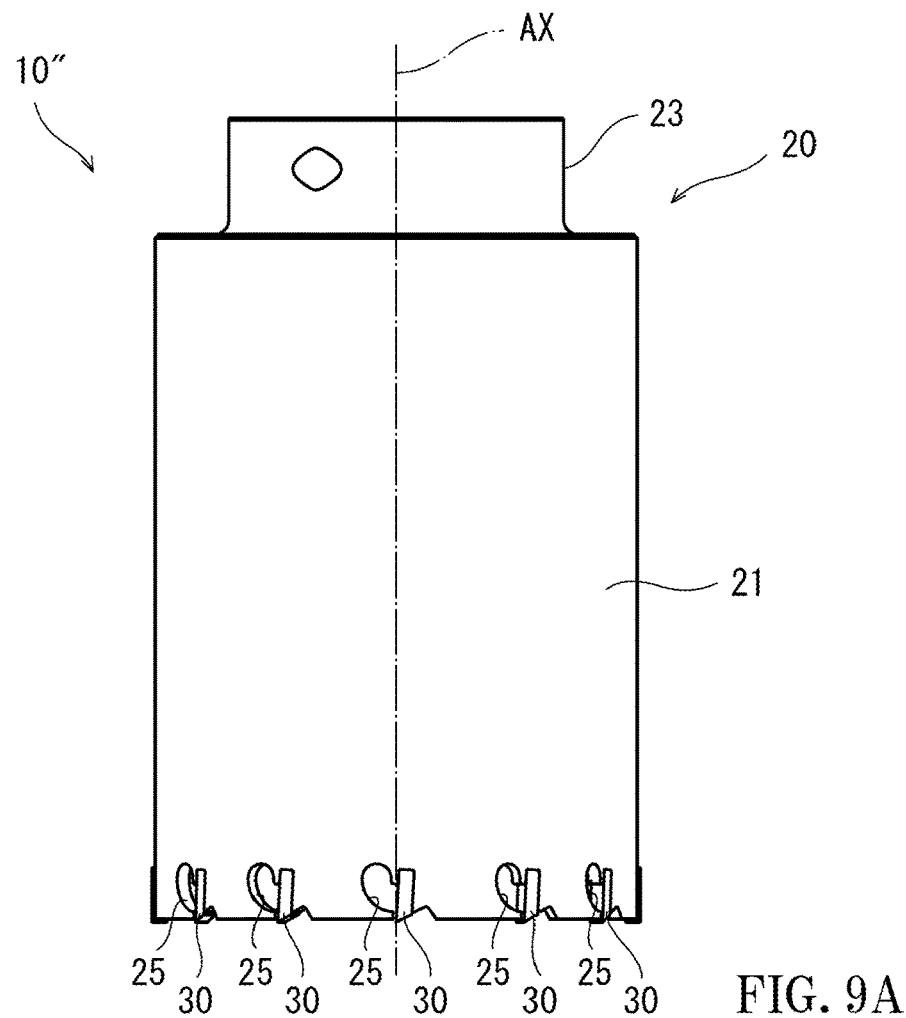
FIGS. 9A and 9B show a second variation of the core cutter according to the one embodiment of the present invention.
Figure 9B:
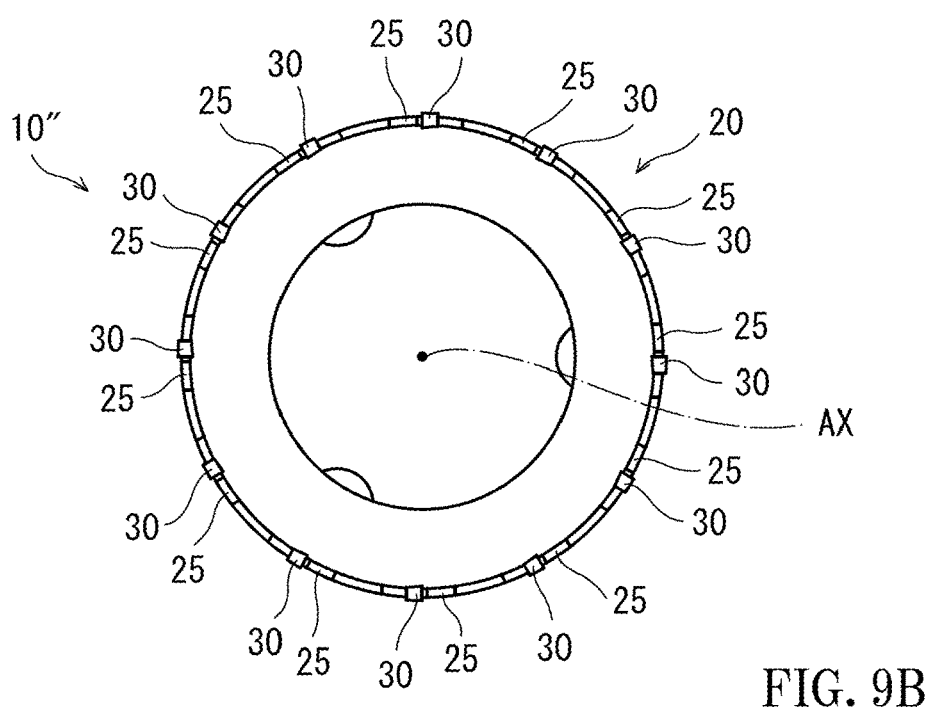
Figure 10:
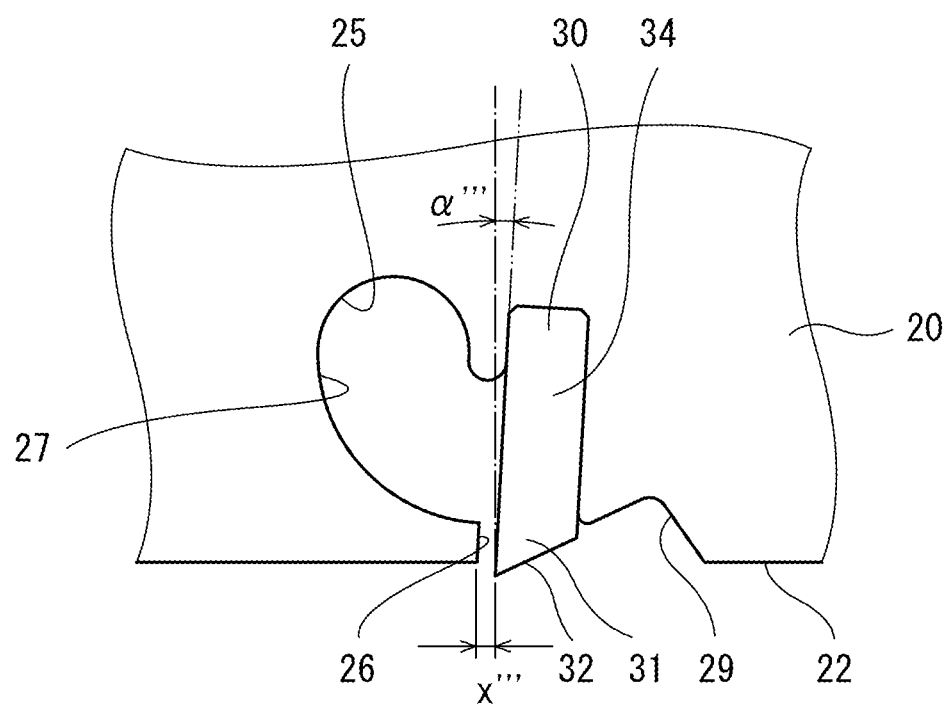
FIG. 10 is an enlarged front view showing the bit of the second variation of the core cutter according to the one embodiment of the present invention.

With reference to FIGS. 9A to 10, a second variation of the core cutter according to the one embodiment of the present invention is described. FIGS. 9A and 9B show the second variation. FIG. 9A is a front view, and FIG. 9B is a bottom view. FIG. 10 is an enlarged front view showing the bit of the second variation. It should be noted that the core cutter 10" of the second variation is the same in structure as the above-described core cutter 10' of the first variation, except the rake angles of the bits 30. Therefore, common components between the above-described core cutter 10' and the core cutter 10" of the second variation are denoted by the same reference signs, and repeating the same descriptions is avoided herein.

As shown in FIGS. 9A and 9B, the core cutter 10" of the present variation includes the cylindrical body 20 and the tipped bits 30. The tipped bits 30 are disposed in a manner to protrude from the distal end of the body 20. It should be noted that, similar to the above-described core cutter 10 (see FIGS. 1 to 3B) and core cutter 10' (see FIGS. 7A to 8), the core cutter 10" of the present variation includes 10 tipped bits 30.

As shown in FIG. 10, in the core cutter 10" of the present variation, the notch 25 is formed adjacently to each bit 30 at a position forward of the bit 30 in the rotation direction of the body 20. The rake angle α'" of the bit 30 is a positive angle, and the width X'" of the notch 25 in the circumferential direction at the distal end of the body 20 is less than or equal to 1.0 mm.

In the core cutter 10" according to the present variation, since the rake angle α'" of the bit 30 is a positive angle, the cutting quality of the core cutter 10" can be improved compared to a case where the rake angle is a negative angle. It should be noted that advantageous effects provided owing to the feature that the width X'" of the notch 25 in the circumferential direction at the distal end of the body 20 is less than or equal to 1.0 mm are the same as those provided in the above-described embodiment and first variation. Therefore, the description thereof is not repeated herein.

(First Variation of Cutting Method)

Figure 11:
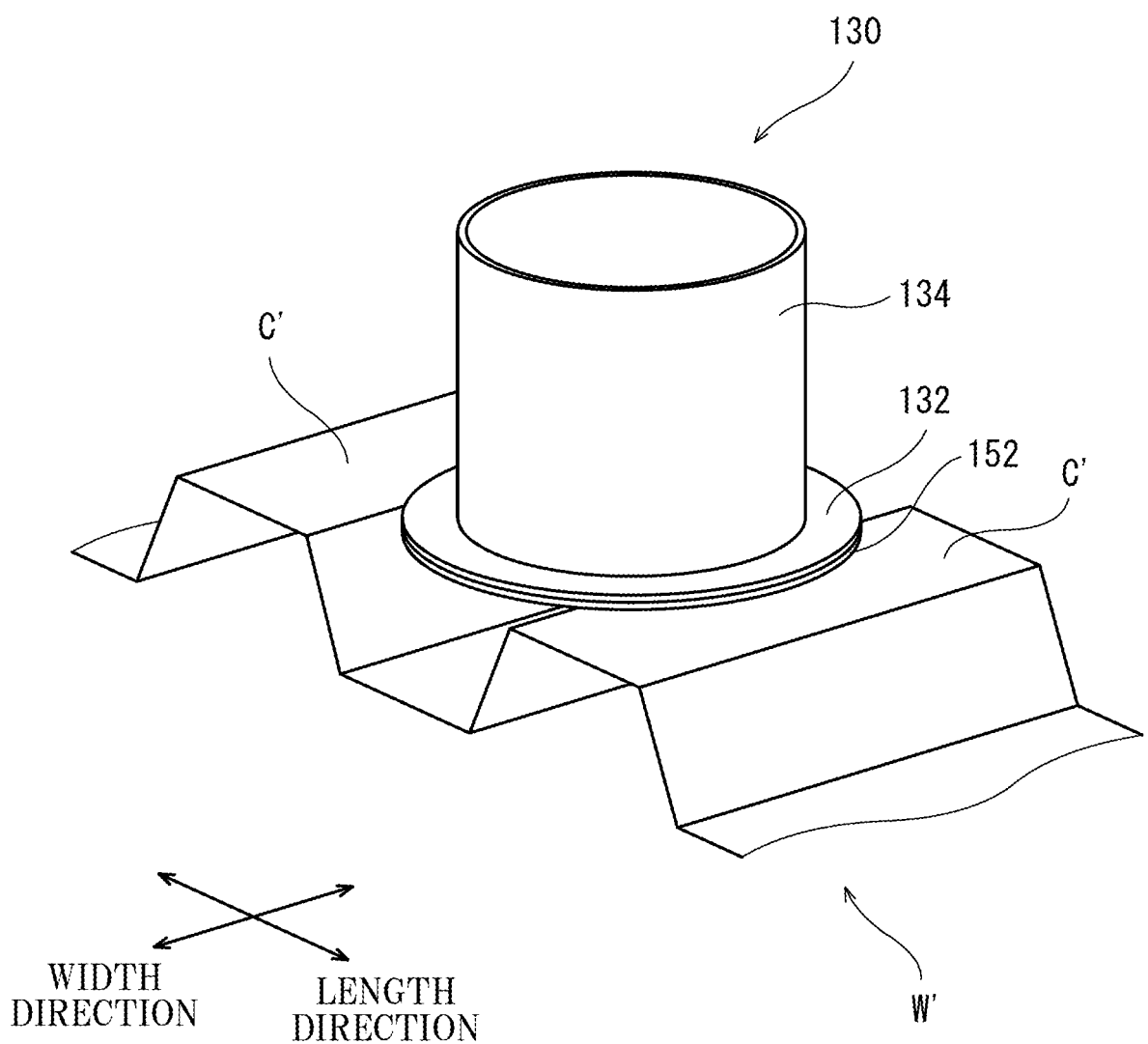
FIG. 11 is a perspective view showing a state where a jig that is used together with the core cutter in a first variation of the cutting method according to the one embodiment of the present variation is placed on a workpiece.
Figure 12:
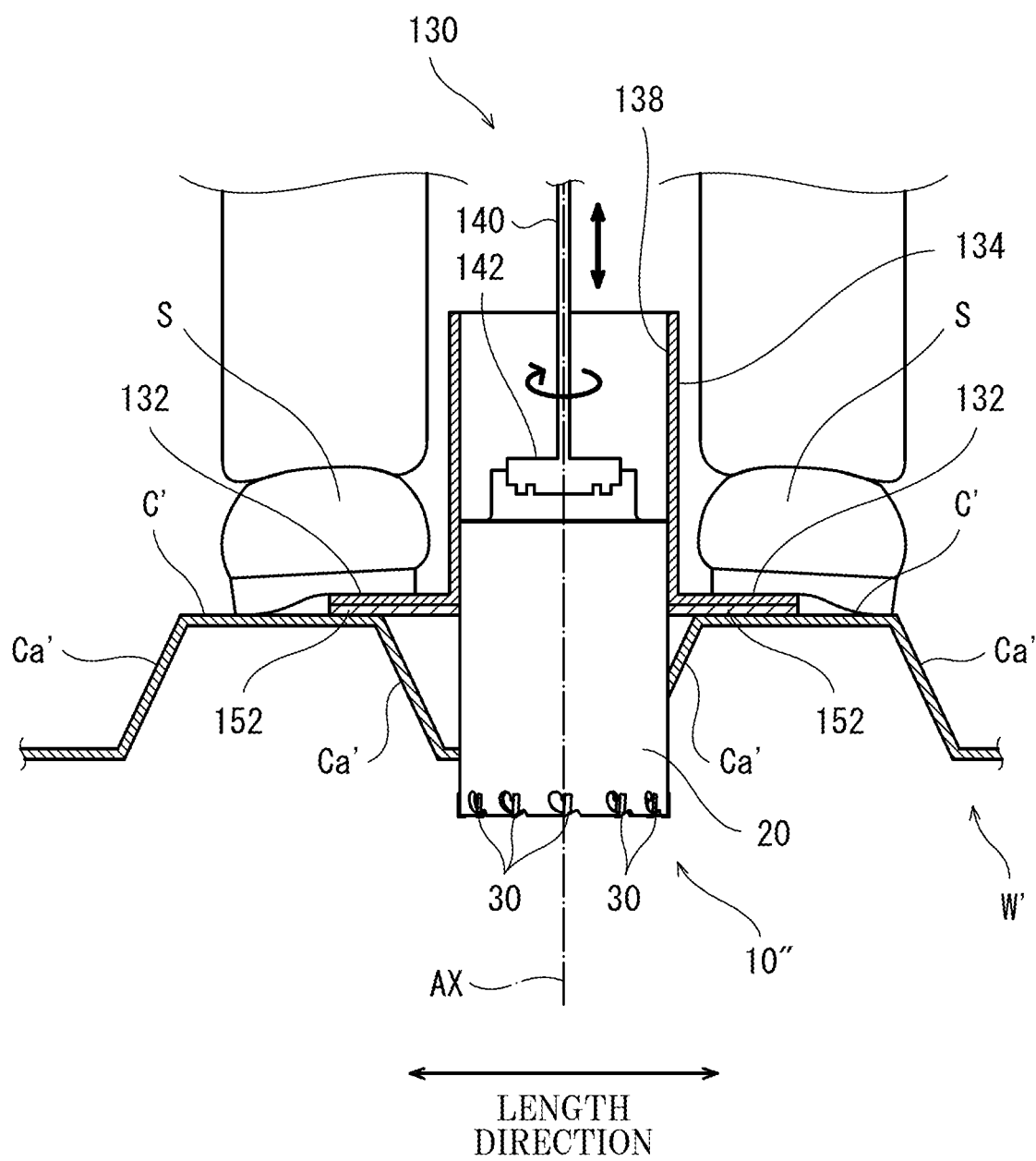
FIG. 12 is a schematic diagram showing a state where the workpiece is being cut by the first variation of the cutting method according to the one embodiment of the present invention.

Next, with reference to FIG. 11 and FIG. 12, a first variation of the cutting method, which is performed by using the core cutter 10" according to the second variation, is described. FIG. 11 is a perspective view showing a state where a jig that is used together with the core cutter in the cutting method according to the present variation is placed on a workpiece. FIG. 12 is a schematic diagram showing a state where the workpiece is being cut by the cutting method according to the present variation.

First, the core cutter 10" according to the second variation, an electric drill to which the core cutter 10" is to be mounted as a distal end tool, a jig 130, and a workpiece W' having irregularities on the surface thereof, are prepared.

As shown in FIG. 11, the jig 130 includes a disc-shaped base portion 132 and a cylinder 134 (a cylindrical portion). The cylinder 134 is provided upright at the center of the upper surface of the base portion 132. A through-hole 138 is drilled in the jig 130, and has the same diameter from the bottom surface of the base portion 132 to the upper end of the cylinder 134. The diameter of the through-hole 138 corresponds to the external diameter of the body main part 21 of the core cutter 10". Specifically, the diameter of the through-hole 138 of the jig 130 is slightly greater than the external diameter of the body main part 21 of the core cutter 10" so that, as described below, the body main part 21 of the core cutter 10" can be inserted into the through-hole 138 while restricting movement of the body main part 21 in the radial direction.

Further, as shown in FIG. 11, the workpiece W' is configured as a plate-shaped deck plate having at least two projections C' on the surface thereof (hereinafter, the at least two projections C' are simply referred to as "two projections C'" or "one projection C' and the other projection C'" unless they need to be specifically referred to as "at least two projections C'"). It should be noted that the workpiece W' is a metal workpiece. The two projections C' are parallel to each other and extend in the width direction of the workpiece W. Each of the two projections C' is formed by bending a part of the plate-shaped deck plate. Accordingly, the thickness of each of the two projections C' is the same as the thickness of the remaining part of the plate-shaped deck plate. Also, the bottom face of each projection C' is open, and thus each projection C' is formed as a hollow projection.

When seen in the width direction of the workpiece W', each of the two projections C' has a bottom face and an upper face. Hereinafter, the bottom face is referred to as "the lower bottom" and the upper face is referred to as "the upper bottom". The lower bottom is longer than the upper bottom. That is, each projection C' is in the shape of a trapezoid. It should be noted that, as mentioned above, the bottom face of each projection C' is open. According to this configuration, the two legs of the trapezoid are respective rising portions Ca' of the projection C'. It should be noted that the trapezoid is an isosceles trapezoid. Accordingly, when seen in the width direction of the workpiece W', the two rising portions Ca' of each projection C' have the same length.

When seen in the width direction of the workpiece W', one end (the right end in FIGS. 11 and 12) of the lower bottom of one projection C' (the projection C' present on the left side in FIGS. 11 and 12, and the other end (the left end in FIGS. 11 and 12) of the lower bottom of the other projection C' (the projection C' present on the right side in FIGS. 11 and 12), are connected by a connector that has the same length as the length of the upper bottom of the one projection C' (and the same length as the length of the upper bottom of the other projection C'). Accordingly, when the workpiece W' is placed upside down, grooves are formed, which form the same trapezoid as the one projection C' (or the other projection C') between the one projection C' and the other projection C'.

Next, the jig 130 is placed on the workpiece W', which is shown in FIG. 11. As shown in FIG. 11, the jig 130 is placed on the workpiece W', such that one side of the bottom surface of the base portion 132 of the jig 130 is in contact with the upper face of the one projection C', and the other side of the bottom surface of the base portion 132 is in contact with the upper face of the other projection C' (i.e., in a manner to cover a part of the upper face of the groove formed between the one projection C' and the other projection C'). It should be noted that a nonslip member 152 is disposed between the bottom surface of the base portion 132 and the upper faces of the respective projections C' of the workpiece W'.

Also, the jig 130 is placed on the workpiece W' such that, when seen in the width direction of the workpiece W' (i.e., in the view shown in FIG. 12), the position of one edge of the through-hole 138 (the left-side edge in FIG. 12) at the bottom surface of the jig 130 coincides with the position of the bottom face of the groove of the workpiece W' in the length direction of the workpiece W', and also, the position of the other edge of the through-hole 138 (the right-side edge in FIG. 12) at the bottom surface of the jig 130 coincides with the middle part of the rising portion Ca' of the other projection C' in the length direction of the workpiece W'.

Further, the core cutter 10" previously described with reference to FIG. 9A to FIG. 10 is mounted to the electric drill as a distal end tool. It should be noted that the electric drill has the same structure as that of the electric drill 100 previously described with reference to FIG. 4, except the following points: in the electric drill 100 shown in FIG. 4, the center drill 120 is disposed in a manner to protrude from the opening at the distal end 22 of the body 20; and the shank (not shown) is disposed in a manner to extend from the proximal end portion 23 of the body 20 toward the opposite side to the center drill 120. Therefore, repeating the same descriptions is avoided herein.

In the present variation, a rod-shaped rotor 140 is held by the mounting chuck of the electric drill, and the proximal end of the core cutter 10" is mounted to a mounting portion 142 provided on the distal end of the rotor 140 (see FIG. 12). At the time, the rotor 140 of the electric drill is disposed in a manner to extend on the same straight line as the axis AX of the core cutter 10".

Then, as shown in FIG. 12, by (the rotor 140 of) the electric drill, the core cutter 10" is rotated about the rotational axis, which is the axis AX of the core cutter 10". The rotating core cutter 10" is, from the upper end side of the jig 130, inserted into the through-hole 138 of the jig 130, which is placed on the workpiece W. At the time, in the present variation, parts of the base portion 132 of the jig 130, the parts being placed on the upper ends of the respective two projections C' of the workpiece W', are stepped on by both feet S of a worker and thereby fixed while the core cutter 10" is being inserted into the through-hole 138 of the jig 130 from the upper end side of the jig 130.

While rotating, the distal end portion of the core cutter 10" protrudes from the bottom surface side of the through-hole 138 of the jig 130. Then, the distal end side of the core cutter 10" is pressed against the rising portion Ca' of the irregularities (specifically, the rising portion Ca' of the other projection C') along the rising direction of the rising portion Ca', and thereby a part of the irregularities (specifically, a part of the other projection C') is cut. It should be noted that the expression "the distal end side of the core cutter 10" is pressed . . . along the rising direction of the rising portion Ca' of the projection C'" herein encompasses not only a case where the pressing direction of the core cutter 10" and the rising direction of the rising portion Ca' of the projection C' are parallel to each other, but also a case where these directions are inclined relative to each other by a certain angle.

Here, assume a case where the rising portion Ca' of the other projection C' is cut only by the core cutter 10" and the electric drill without using the jig 130. At the time, if the distal end of the core cutter 10" is pressed against the rising portion Ca' to cut the rising portion Ca', then the core cutter 10" oscillates due to, for example, the fact that the rising portion Ca' is inclined. Therefore, it is difficult to cut the workpiece W' as desired.

On the other hand, by using the jig 130, the distal end of the core cutter 10" is pressed against the rising portion Ca' of the other projection C' in a state where a part of the core cutter 10" is positioned within the through-hole 138 of the jig 130. That is, movement of the core cutter 10" in the radial direction is restricted by the jig 130, and thereby the oscillation of the core cutter 10" can be prevented. Consequently, the cutting method according to the present variation makes it possible to cut, as desired, the workpiece W' having irregularities.

Further, in the present variation, the worker performs the cutting work while fixing the base portion 132 by stepping on the base portion 132 with both of his or her feet S. This makes it possible to cut the workpiece W' as desired more assuredly. Still further, the nonslip member 152 is provided between the bottom surface of the base portion 132 and the upper faces of the respective projections C' of the workpiece W. This makes it possible to cut the workpiece W' as desired even more assuredly.

(Second Variation of Cutting Method)

Figure 13:
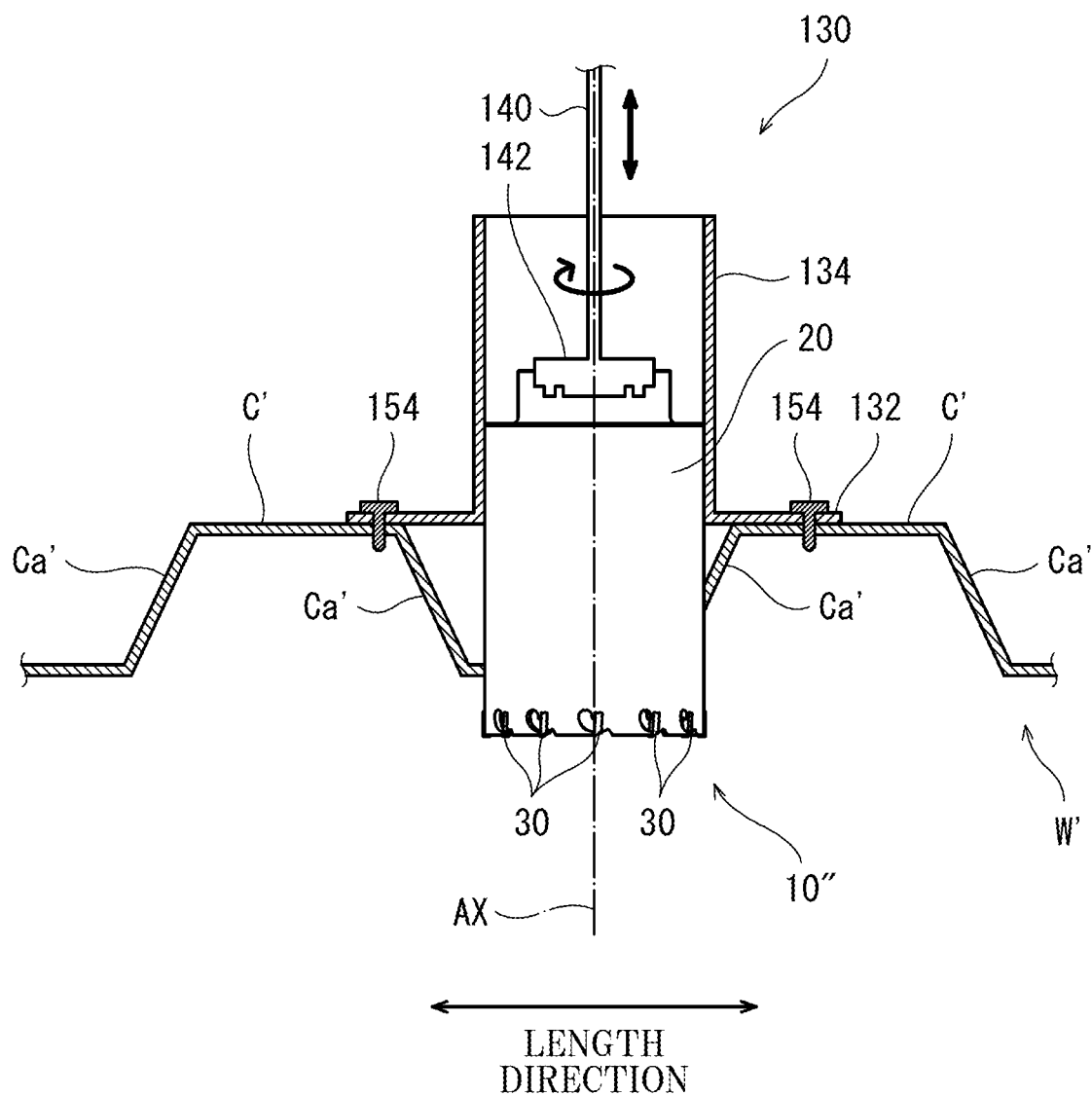
FIG. 13 is a schematic diagram showing a state where the workpiece is being cut by a second variation of the cutting method according to the one embodiment of the present invention.

Next, with reference to FIG. 13, a second variation of the cutting method, which is performed by using the core cutter 10" according to the second variation, is described. FIG. 13 is a schematic diagram showing a state where a workpiece is being cut by the cutting method according to the present variation. It should be noted that the cutting method according to the present variation is the same as the above-described cutting method according to the first variation except the manner of fixing the jig 130 to the workpiece W'. Therefore, common components between the first variation and the second variation are denoted by the same reference signs, and repeating the same descriptions is avoided herein.

In the cutting method according to the present variation, as shown in FIG. 12, parts of the base portion 132 of the jig 130, the parts being placed on the upper ends of the respective two projections C' of the workpiece W', are fixed by screws (fixing members) 154. In a state where the jig 130 is thus fixed to the workpiece W', the core cutter 10" may be inserted into the through-hole 138 of the jig 130 from the upper end side of the jig 130 to cut a part of the workpiece W'.

It should be noted that the fixing members are not limited to the screws 154. For example, each fixing member may be a fixing member between which an edge of the jig 130 and an edge of the workpiece W', which are disposed one on top of the other, are sandwiched in their thickness direction, and thereby the jig 130 may be fixed to the workpiece W. Alternatively, each fixing member may be configured differently.

(Other Variations)

In the above-described embodiment and variations, the body 20 includes the body main part 21 and the proximal end portion 23. The proximal end portion 23 is continuous with the proximal end surface of the body main part 21, and has a less diameter than that of the body main part 21. However, this is a non-limiting example. As an alternative example, the body 20 may be formed such that the diameter of the body 20 is constant from its distal end to the proximal end. This makes it possible to readily manufacture the body main part 21.

In the above-described embodiment and variations, each of the core cutters 10, 10', and 10" is mounted to the electric drill 100 and rotated. However, each of these cases is a non-limiting example. As an alternative example, the core cutter 10 may be mounted to a driver drill, an impact drill, or a hammer drill. It should be noted that, in a case where the electric drill is an impact drill or a hammer drill, it is preferable to use the electric drill in a rotation mode that does not cause impacting or hammering action.

In the foregoing description, in the first and second variations of the cutting method according to the present invention (see FIGS. 12 and 13), the jig 130 and the workpiece W' are used together with the core cutter 10" (see FIGS. 9A to 10). However, these are non-limiting examples. As an alternative example, the jig 130 and the workpiece W' may be used together with the core cutter 10 previously described with reference to FIGS. 1 to 3B, or may be used together with the core cutter 10' previously described with reference to FIG. 7A to 8. Further alternatively, the jig 130 and the workpiece W' may be used together with a core cutter that is different from the above-described core cutters 10, 10', and 10".

REFERENCE CHARACTERS LIST 10 core cutter
20 body
21 body main part
22 distal end of the body
23 proximal end portion
25 notch
26 distal end portion
27 main portion
29 auxiliary notch
30 bit
30a first bit
30b second bit
31 protruding portion
32 distal end
34 fixed portion
36 protruding portion
37 distal end
39 fixed portion
100 electric drill
110 electric drill body
112 mounting chuck
120 center drill
130 jig
132 base portion
134 cylinder
138 through-hole
140 rotor
142 mounting portion
152 nonslip member
154 screw
α rake angle
$D_1$ first distance
$D_2$ second distance
W workpiece
C projection
Ca rising portion
S feet

The invention claimed is:
1. A core cutter comprising:
a cylindrical body; and
a tipped bit that is disposed in a manner to protrude from a distal end of the body, wherein
the core cutter is configured to cut a workpiece with the bit when the body is rotated about a rotational axis that is an axis of the body, at the distal end of the body, a notch is formed adjacently to the bit at a position forward of the bit in a rotation direction of the body,
a width of the notch in a circumferential direction of the body at the distal end of the body is less than or equal to 1.0 mm, the bit includes:
  a protruding portion that protrudes from the distal end of the body; and
  a fixed portion fixed to the body, the fixed portion being located proximal to the distal end of the body, and
entirely from a distal end of the notch to a proximal end of the notch, the width of the notch in the circumferential direction of the body is less than or equal to 1.0 mm, and the proximal end of the notch is positioned closer to the distal end of the body than a proximal end of the fixed portion of the bit.

2. The core cutter according to claim 1, wherein a rake angle of the bit is a negative angle.

3. The core cutter according to claim 1, wherein the width is greater than or equal to 0.5 mm, but less than or equal to 0.9 mm.

4. The core cutter according to claim 3, wherein the width is greater than or equal to 0.6 mm, but less than or equal to 0.8 mm.

5. The core cutter according to claim 1, comprising a plurality of bits, wherein
the notch is formed for each of the bits.

6. The core cutter according to claim 5, wherein
the bits include a first bit and a second bit,
a first distance between a distal end of the first bit and the axis of the body, and a second distance between a distal end of the second bit and the axis of the body, are different from each other, and
the first and second bits are arranged alternately in the circumferential direction of the body.

7. A core cutter comprising:
a cylindrical body; and
a tipped bit that is disposed in a manner to protrude from a distal end of the body, wherein
the core cutter is configured to cut a workpiece with the bit when the body is rotated about a rotational axis that is an axis of the body,
at the distal end of the body, a notch is formed adjacently to the bit at a position forward of the bit in a rotation direction of the body,
a width of the notch in a circumferential direction of the body at the distal end of the body is less than or equal to 1.0 mm,
the bit includes:
  a protruding portion that protrudes from the distal end of the body; and
  a fixed portion fixed to the body, the fixed portion being located proximal to the distal end of the body,
the notch includes:
  a distal end portion; and
  a main portion continuous with a proximal end of the distal end portion,
a width of the distal end portion in the circumferential direction of the body is less than or equal to 1.0 mm,
a width of the main portion in the circumferential direction of the body is greater than 1.0 mm, and
a proximal end of the main portion is positioned closer to a proximal end of the body than a proximal end of the fixed portion of the bit.

8. A cutting method using a core cutter,
the core cutter including:
a cylindrical body; and
a tipped bit that is disposed in a manner to protrude from a distal end of the body, wherein
the core cutter is configured to cut a workpiece with the bit when the body is rotated about a rotational axis that is an axis of the body,
at the distal end of the body, a notch is formed adjacently to the bit at a position forward of the bit in a rotation direction of the body, and
a width of the notch in a circumferential direction of the body at the distal end of the body is less than or equal to 1.0 mm,
the cutting method comprising:
a first step of providing the core cutter, an electric drill to which the core cutter is to be mounted as a distal end tool, and the workpiece having irregularities on a surface thereof;
a second step of mounting the core cutter to the electric drill after the first step; and
a third step of pressing a distal end side of the core cutter against a rising portion of the irregularities along a rising direction of the rising portion while rotating the core cutter by the electric drill about a rotational axis that is an axis of the core cutter to cut a part of the irregularities after the first and second steps.

9. The cutting method according to claim 8,
the workpiece provided in the first step includes at least two projections on the surface thereof,
the first step further includes providing a jig, the jig including:
  a base portion that is placeable on the workpiece such that a bottom surface of the base portion is in contact with upper ends of the respective at least two projections;
  a cylindrical portion provided upright at a center of an upper end of the base portion; and
  a through-hole drilled in the jig from the bottom surface of the base portion to an upper end of the cylindrical portion, the through-hole corresponding to an external diameter of the body of the core cutter, and
the third step includes:
  placing the jig on the workpiece such that the through-hole of the jig on a bottom surface side of the base portion is positioned between the at least two projections, and such that the bottom surface of the base portion is in contact with the upper ends of the respective at least two projections; and then
  inserting the core cutter into the through-hole of the jig placed on the workpiece from an upper end side of the jig while rotating the core cutter by the electric drill about the rotational axis, which is the axis of the core cutter, to cut a part of the at least two projections.

10. The cutting method according to claim 9, wherein
the third step includes fixing the bottom surface of the base portion of the jig, the bottom surface being in contact with the upper ends of the respective at least two projections of the workpiece, to the upper ends of the respective at least two projections of the workpiece, and then inserting the core cutter into the through-hole of the jig from the upper end side of the jig.

11. The cutting method according to claim 10, wherein
the third step includes fixing the bottom surface of the base portion of the jig, the bottom surface being in contact with the upper ends of the respective at least two projections of the workpiece, to the upper ends of the respective at least two projections of the workpiece by stepping on a top surface of the base portion of the jig by feet of an operator, and then inserting the core cutter into the through-hole of the jig from the upper end side of the jig.

12. The cutting method according to claim 10, wherein the third step includes fixing the bottom surface of the base portion of the jig, the bottom surface being in contact with the upper ends of the respective at least two projections of the workpiece, to the upper ends of the respective at least two projections of the workpiece by using fixing members, and then inserting the core cutter into the through-hole of the jig from the upper end side of the jig.

13. A cutting method comprising:
a first step of providing
  a core cutter including a cylindrical body and a tipped bit that is disposed in a manner to protrude from a distal end of the body, the core cutter being configured to cut a workpiece with the bit when the body is rotated about a rotational axis that is an axis of the body,
  an electric drill to which the core cutter is to be mounted as a distal end tool,
  the workpiece having at least two projections on a surface thereof, and
  a jig including a base portion, a cylindrical portion, and a through-hole, the base portion being placeable on the workpiece such that a bottom surface of the base portion is in contact with upper ends of the respective at least two projections, the cylindrical portion being provided upright at a center of an upper end of the base portion, the through-hole being drilled in the jig from the bottom surface of the base portion to an upper end of the cylindrical portion, the through-hole corresponding to an external diameter of the body of the core cutter;
a second step of mounting the core cutter to the electric drill after the first step; and
a third step of, after the first and second steps,
  placing the jig on the workpiece such that the through-hole of the jig on a bottom surface side of the base portion is positioned between the at least two projections of the workpiece, and such that the bottom surface of the base portion is in contact with the upper ends of the respective at least two projections, fixing the bottom surface of the base portion of the jig, the bottom surface being in contact with the upper ends of the respective at least two projections of the workpiece, to the upper ends of the respective at least two projections of the workpiece by stepping on a top surface of the base portion of the jig by feet of an operator, and then
  inserting the core cutter into the through-hole of the jig placed on the workpiece from an upper end side of the jig while rotating the core cutter by the electric drill about a rotational axis that is an axis of the core cutter, and pressing a distal end side of the core cutter against a rising portion of the at least two projections along a rising direction of the rising portion to cut a part of the at least two projections.

* * * * *